United States Patent
Prats et al.

(10) Patent No.: US 10,516,740 B2
(45) Date of Patent: Dec. 24, 2019

(54) DYNAMIC TRANSPORT SWITCHING IN INTER-DEVICE COMMUNICATION

(71) Applicant: Apple Inc., Cupertino, CA (US)

(72) Inventors: Augustin Prats, San Francisco, CA (US); Jason C. Conn, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 187 days.

(21) Appl. No.: 14/475,437

(22) Filed: Sep. 2, 2014

(65) Prior Publication Data

US 2015/0350813 A1 Dec. 3, 2015

Related U.S. Application Data

(60) Provisional application No. 62/005,799, filed on May 30, 2014.

(51) Int. Cl.
| | |
|---|---|
| H04L 29/08 | (2006.01) |
| H04W 88/06 | (2009.01) |
| H04W 4/80 | (2018.01) |
| H04W 36/14 | (2009.01) |
| H04W 36/24 | (2009.01) |
| H04W 84/20 | (2009.01) |

(52) U.S. Cl.
CPC ............ *H04L 67/125* (2013.01); *H04W 4/80* (2018.02); *H04W 88/06* (2013.01); *H04W 36/14* (2013.01); *H04W 36/24* (2013.01); *H04W 84/20* (2013.01)

(58) Field of Classification Search
CPC .... H04L 67/125; H04W 88/06; H04W 36/14; H04W 36/24; H04W 84/20; H04W 4/008; H04W 36/023; H04W 76/02

USPC ........................................................ 370/252
See application file for complete search history.

(56) References Cited

U.S. PATENT DOCUMENTS

| | | | |
|---|---|---|---|
| 5,765,187 A * | 6/1998 | Shimizu | .................... G06F 5/14 710/22 |
| 6,111,865 A | 8/2000 | Butler et al. | |
| 2004/0248615 A1* | 12/2004 | Purkayastha | ..... H04W 36/0066 455/552.1 |
| 2005/0188098 A1 | 8/2005 | Dunk | |

(Continued)

FOREIGN PATENT DOCUMENTS

| | | |
|---|---|---|
| EP | 2445257 A1 | 4/2012 |
| WO | 2015/183378 A1 | 12/2015 |

OTHER PUBLICATIONS

"What is RTS and CTS flow control?", Electrical Engineering Stack Exchange, Aug. 2012 <URL:https://electronics.stackexchange.com/questions/38022/what-is-rts-and-cts-flow-control>.*

(Continued)

*Primary Examiner* — Backhean Tiv
*Assistant Examiner* — Jonathan A Sparks
(74) *Attorney, Agent, or Firm* — Kilpatrick, Townsend and Stockton LLP

(57) ABSTRACT

A transport for data communication can be selected based on current data communication activity. A master device and a slave device can establish a control channel on one transport and one or more data channels. A master device can determine which transport should be used for the data channel(s) based on real-time status information about the data exchange and can coordinate with the slave device to switch the data channel(s) to a different transport when appropriate.

29 Claims, 7 Drawing Sheets

(56) References Cited

U.S. PATENT DOCUMENTS

| | | | |
|---|---|---|---|
| 2007/0011335 A1 | 1/2007 | Burns et al. | |
| 2008/0144645 A1* | 6/2008 | Russell | H04L 47/10 370/412 |
| 2008/0310332 A1 | 12/2008 | Hansen et al. | |
| 2009/0221271 A1* | 9/2009 | Soma | H04M 1/7253 455/414.1 |
| 2010/0085975 A1 | 4/2010 | Wang et al. | |
| 2010/0128695 A1 | 5/2010 | Nagaraja | |
| 2011/0002344 A1 | 1/2011 | Palin et al. | |
| 2012/0311166 A1* | 12/2012 | Garcia, Jr. | H04L 69/321 709/228 |
| 2013/0099920 A1 | 4/2013 | Song et al. | |
| 2013/0235844 A1* | 9/2013 | Ge | H04W 36/00 370/331 |
| 2013/0286942 A1* | 10/2013 | Bonar | H04B 7/0689 370/328 |
| 2013/0308603 A1* | 11/2013 | Erceg | H04W 36/0066 370/331 |
| 2015/0065055 A1* | 3/2015 | Newham | H04W 52/0251 455/41.3 |
| 2015/0103708 A1* | 4/2015 | Kang | H04W 76/023 370/311 |
| 2015/0271808 A1* | 9/2015 | Liang | H04W 4/023 370/329 |
| 2015/0350813 A1 | 12/2015 | Prats et al. | |
| 2016/0198290 A1* | 7/2016 | Hong | H04B 17/318 455/41.2 |

OTHER PUBLICATIONS

International Search Report and Written Opinion dated Jun. 22, 2015 in PCT/US2015/020809, 15 pages.

Foley, Michael, "How Bluetooth and 802.11 will team up to deliver high speed wireless connections," EE Times, May 13, 2008, [online], [retrieved on Mar. 4, 2014], retrieved from the internet : <URL: http://www.eetimes.com/document.asp?doc_id=1273551&print=yes 3/>, 6 pages.

U.S. Appl. No. 14/656,347, "Notice of Allowance", dated Dec. 16, 2016, 17 pages.

* cited by examiner

US 10,516,740 B2

DYNAMIC TRANSPORT SWITCHING IN INTER-DEVICE COMMUNICATION

CROSS-REFERENCE TO RELATED APPLICATIONS

This application claims the benefit of U.S. Provisional Application No. 62/005,799, filed May 30, 2014, entitled "Dynamic Transport Switching in Inter-Device Communication," the disclosure of which is incorporated by reference herein in its entirety. This application is also related to U.S. Provisional Application No. 62/005,606, filed May 30, 2014, entitled "UTun Controller/Link Manager," the disclosure of which is incorporated by reference herein in its entirety.

BACKGROUND

The present disclosure relates generally to inter-device communication via a wireless link and more particularly to dynamic transport switching for inter-device communication.

Wireless communication technologies have proliferated in recent years. For instance, the IEEE 802.11 family of standards defines a wireless network protocol stack that includes MAC-layer and PHY-layer protocols for a variety of data rates. Bluetooth® standards, promulgated by Bluetooth SIG, Inc., define MAC and PHY layers and various packet formats to support a variety of data rates for short-range peer-to-peer communication, including Basic Rate (BR), Enhanced Data Rate (EDR), and Low Energy (LE) options. The choice of wireless communication technology for a particular application depends on various considerations, such as throughput requirements and signal strength requirements. In general, higher throughput and higher signal strength are associated with improved performance but at the cost of increased power consumption.

SUMMARY

According to certain embodiment of the present invention, power consumption in the presence of time-varying throughput requirements and changing operating conditions can be reduced or optimized by dynamically selecting a transport based on current data communication activity. For example, a master device and a slave device can each support multiple different transports, such as Bluetooth LE, Bluetooth BR/EDR (also referred to as Classic Bluetooth), and IEEE 802.11 transports. The transports can be ranked in order according to a power-consumption metric (e.g., microwatts per byte). The devices can establish a control channel on the lowest-power transport (e.g., Bluetooth LE) and can also establish one or more data channels. The master device can determine which transport should be used for the data channels based on real-time status information about the data exchange. This status information can include any or all of the slave device's requirements for data transfer, the master device's requirements for data transfer, a data rate to be sent from the master device, a data rate to be sent from the slave device, a throughput measurement of the data channel, a link quality measurement, a buffer usage measurement, information as to what (if any) other devices are sharing access to various transports, and a transition time for moving the data channel to a new transport. If the transport currently being used for data is not providing adequate performance, the transport for the data channel can be upgraded to increase throughput. If the transport is providing performance that is more than adequate (e.g., above some margin), the transport for the data channel can be downgraded to reduce power consumption. In some embodiments, the control channel can remain on the lowest-power transport while the data channel dynamically switches among transports (which can include the lowest-power transport) based on changes in data-transfer requirements and/or operating conditions. Accordingly, the control channel can remain available for signal exchange while the transport for the data channel is in the process of switching, so that some communication is always possible.

The following detailed description together with the accompanying drawings will provide a better understanding of the nature and advantages of the present invention.

DETAILED DESCRIPTION

According to certain embodiment of the present invention, power consumption in the presence of time-varying throughput requirements and changing operating conditions can be reduced or optimized by dynamically selecting a transport based on current data communication activity. For example, a master device and a slave device can each support multiple different transports, such as Bluetooth LE, Bluetooth BR/EDR (also referred to as Classic Bluetooth), and IEEE 802.11 transports. The transports can be ranked in order according to a power-consumption metric (e.g., microwatts per byte). The devices can establish a control channel on the lowest-power transport (e.g., Bluetooth LE) and can also establish one or more data channels. The master device can determine which transport should be used for the data channels based on real-time status information about the data exchange. This status information can include any or all of the slave device's requirements for data transfer, the master device's requirements for data transfer, a data rate to be sent from the master device, a data rate to be sent from the slave device, a throughput measurement of the data channel, a link quality measurement, a buffer usage measurement, information as to what (if any) other devices are sharing access to various transports, and a transition time for moving the data channel to a new transport. If the transport currently being used for data is not providing adequate performance, the transport for the data channel can be upgraded to increase throughput. If the transport is providing performance that is more than adequate (e.g., above some margin), the transport for the data channel can be downgraded to reduce power consumption. In some embodiments, the control channel can remain on the lowest-power transport while the data channel dynamically switches among transports (which can include the lowest-power transport) based on changes in data-transfer requirements and/or operating conditions. Accordingly, the control channel can remain available for signal exchange while the transport for the data channel is in the process of switching, so that some communication is always possible.

Figure 1:
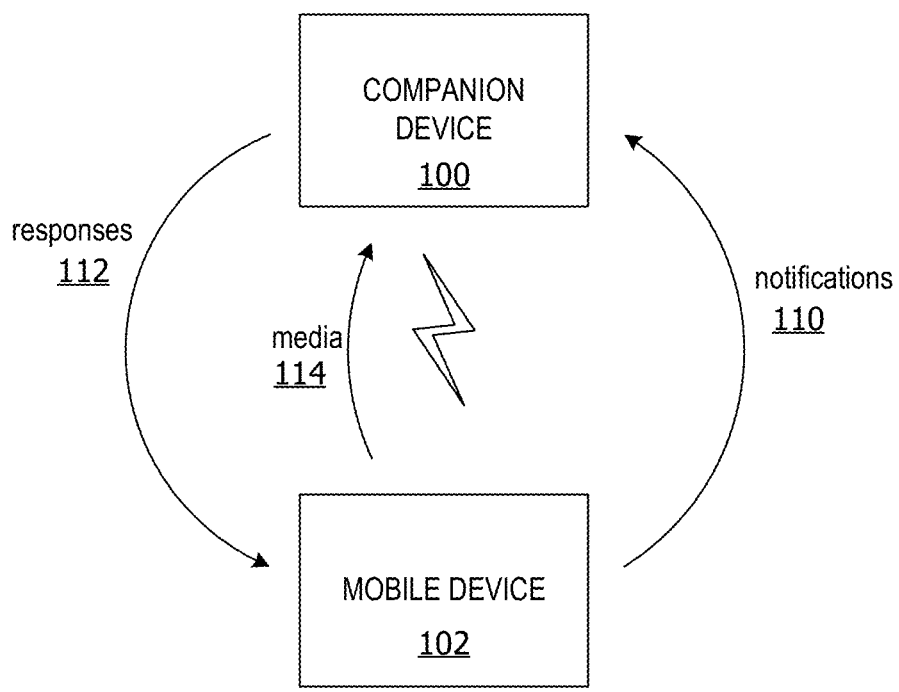
FIG. 1 shows a companion device communicating wirelessly with a mobile device according to an embodiment of the present invention.

FIG. 1 shows a companion device 100 communicating wirelessly with a mobile device 102 according to an embodiment of the present invention.

Mobile device 102 can be any device that a user might routinely carry from place to place and use in different places. For example, mobile device 102 can be a handheld device that is designed to be held in a user's hand (or hands) during active use and stowed somewhere (e.g., in a pocket or bag or on a table) when not in use, such as a smart phone, a tablet computer, a media player, or any type of mobile phone or other handheld computing and/or communication device. In some embodiments, mobile device 102 can also be a laptop computer or the like.

Companion device 100 can be a device that can communicate wirelessly with mobile device 102, e.g., using protocols such as Bluetooth® protocols (defined and promulgated by Bluetooth SIG), Wi-Fi® protocols (defined and promulgated by the Wi-Fi Alliance), other IEEE 802.11 protocols, or the like. Such communication can, for example, allow companion device 100 to interoperate with mobile device 102 and can be designed to be wearable. In some embodiments, companion device 100 can be physically smaller than mobile device 102. For example, companion device 100 can be a wrist-worn device, a device that is clipped or pinned to the user's clothing, a device with a lanyard or chain that is wearable around the user's neck, a headband device, eyeglasses, or any other device that can be secured to the user's person or clothing. In some embodiments, companion device 100 can include a touchscreen display that supports user input and user output and an attachment member (e.g., a strap, belt, band, chain, clip, clasp, or the like) that allows companion device 100 to be secured to the user's person or clothing. Other components such as speakers or an audio jack to audio output, a microphone to receive audio input, a camera, motion sensors (e.g., accelerometer), or the like can be provided. In some embodiments, companion device 100 can also communicate with other host devices that are not necessarily mobile, such as desktop computer systems, point-of-sale terminals, security systems, environmental control systems, and so on.

In operation, companion device 100 and mobile device 102 can interoperate to enhance functionality of mobile device 102 and/or to facilitate user access to functionality provided by mobile device 102. For example, companion device 100 and mobile device 102 can establish a pairing using a wireless communication technology such as Bluetooth and can communicate various types of data to each other via the wireless channel. For example, mobile device 102 can send notifications 110 of selected events (e.g., receiving a phone call, text message, email message, or other information) to companion device 100, and companion device 100 can present corresponding alerts to the user. Companion device 100 can also provide an input interface via which a user can respond to an alert (e.g., to answer a phone call, reply to a text message, or access other information), and companion device 100 can send responsive signals 112 to mobile device 102, e.g., to indicate whether the call should be answered or diverted to voicemail. As another example, a user can operate a user interface (e.g., a touchscreen) of companion device 100 to initiate or control an action on mobile device 102, such as unlocking mobile device 102 or turning on its display screen, placing a phone call, or sending a text message, or controlling media playback operations of mobile device 102. As another example, mobile device 102 can stream media content 114 (e.g., audio data such as a voice mail or music track, or video data) to companion device 100, and companion device 100 can present streamed media content 114 to the user. The user can control media streaming by interacting with the user interface of companion device 100, and companion device 100 can send control signals to mobile device 102, e.g., to select content to be streamed and/or to start or stop streaming. Other types of data exchange can also be supported.

It will be appreciated that companion device 100 and mobile device 102 are illustrative and that variations and modifications are possible. For example, companion device 100 can be implemented in a variety of articles, including but not limited to wearable articles. In some embodiments, companion device 100 can be operative regardless of whether mobile device 102 is in communication with companion device 100.

In the examples above as well as other use-cases, companion device 100 and mobile device 102 can exchange data of various types using one or more wireless communication channels. To provide a pleasant user experience, the communication needs to be reliable enough, and latency needs to be kept low enough, to avoid noticeable disruptions or delays, regardless of what type of data is being exchanged. Thresholds for "enough" can vary, depending on the particular applications and/or area types in use in a given situation.

The variability of the data throughput requirements might suggest the desirability of using a high-bandwidth transport that can handle the peak demands that might be placed on the communication channel. However, if companion device 100 and/or mobile device 102 are battery-powered, the high energy consumption typically associated with a high-bandwidth transport can weigh against such a design.

According to certain embodiment of the present invention, power consumption in the presence of time-varying throughput requirements and changing operating conditions can be reduced or optimized by dynamically selecting a transport based on current data communication activity. For example, mobile device 102 and companion device 100 can each support multiple different transports, such as Bluetooth LE, Bluetooth BR/EDR (also referred to as Classic Bluetooth), and IEEE 802.11 transports. The devices can establish a control channel on the lowest-power transport (e.g., Bluetooth LE). The control channel can be used to maintain a constant connection and to provide control information, including data exchange status information. The devices can also establish one or more data channels. For purposes of managing the dynamic transport selection, one device (e.g., mobile device 102) can be designated as the "master" device and the other device (e.g., companion device 100) as the "slave" device. The master device can determine which transport should be used for the data channels based on status information about the data exchange and the data requirements at a given time. If the transport currently in use for the data channels is not providing adequate performance, the transport can be upgraded to increase throughput. If the transport is providing performance that is more than adequate (e.g., above some margin), the transport can be downgraded to reduce power consumption. Examples of dynamic transport switching are described below.

Figure 2:
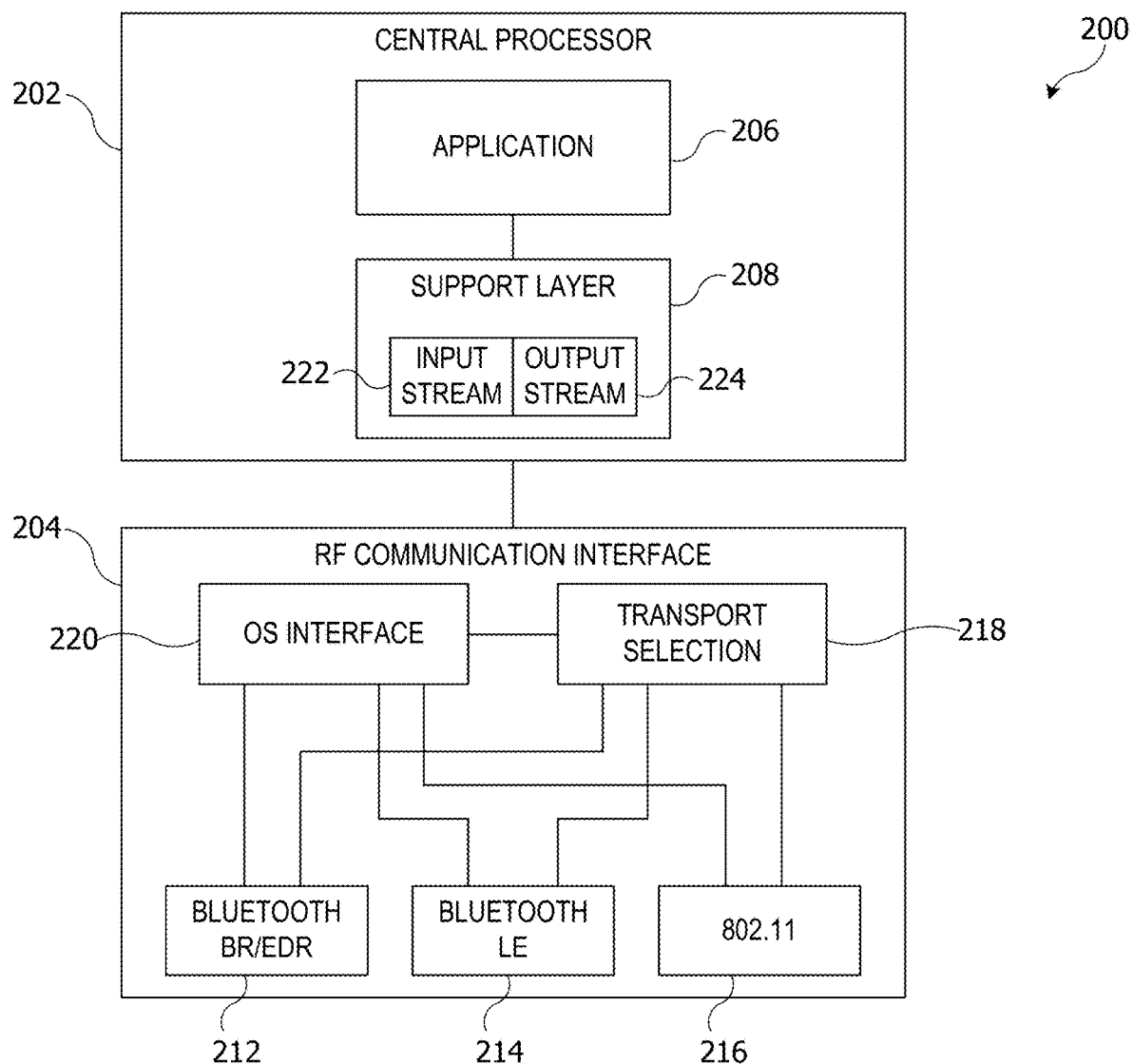
FIG. 2 shows a simplified block diagram of components of a computing system according to an embodiment of the present invention.

Dynamic transport switching can be implemented in a variety of computing devices, including either or both of mobile device 102 and companion device 100. FIG. 2 shows a simplified block diagram of components of a computing system 200 that can be implemented in companion device 100 and/or mobile device 102 according to an embodiment of the present invention. Computing system 200 can include a central processor 202 and a radio-frequency (RF) communication interface 204. In some embodiments, computing system 200 can include other components (not shown) such as user interface components (e.g., display, speakers, keyboard, touch screen, touch pad, microphone), sensor devices (e.g., pressure sensors, acceleration sensors, directional sensors, ambient light sensors), telephony components (e.g., cellular voice and/or data network transceiver), camera components, power components (e.g., battery, power management circuitry, battery-charging circuitry) and so on.

Central processor 202, which can be of generally conventional design and can include one or more processor chips, can execute software such as one or more applications 206 and support layer 208. Applications 206 can facilitate user interaction with computing system 200 to perform operations such as placing or receiving phone calls, reading or composing various kinds of messages (e.g., text messages, email messages), playing media content, and so on. Support layer 208, which can be part of an operating system executing on central processor 202, can implement services and functionality to support applications 206, including an application program interface to allow applications 206 to invoke communication functions of computer system 200. For example, support layer 208 can facilitate data exchange between an application 206 and another device by providing an input stream 222, to which application 206 can write data to be sent to another device, and an output stream 224, from which application 206 can read data received from another device. Where multiple applications 206 are executing, each application 206 can be provided with its own input stream 222 and output stream 224. In some embodiments, input stream 222 and output stream 224 can serve to hide details of communication operations, such as operations performed by RF communication interface 204, from applications 206. Accordingly, applications 206 can format data as they see fit and can be unaware that dynamic transport switching is taking place or of which transport is being used to send and receive data.

RF communication interface 204 can be implemented in one or more integrated circuits, which can include fixed-function circuits or programmable logic circuits controlled by firmware instructions that can be stored in memory within or local to RF communication interface 204. RF communication interface 204 can include radio circuit components (e.g., oscillators, modulators, demodulators, amplifiers, antennas) that physically enable transmission and reception of data-carrying RF signals.

Multiple RF communication channels or transports can be supported by providing a transceiver module for each transport. For example, shown in FIG. 2 are a Bluetooth BR/EDR transceiver module 212, a Bluetooth LE transceiver module 214, and an IEEE 802.11 transceiver module 216. Bluetooth BR/EDR transceiver module 212 can support basic-rate and enhanced data rate communications conforming to standards promulgated by Bluetooth SIG, Inc. Bluetooth LE transceiver module 214 can support communications conforming to the Bluetooth Low Energy standards promulgated by Bluetooth SIG, Inc. 802.11 transceiver module 216 can support communications conforming to various IEEE 802.11 family standards, including 802.11a, 802.11b, 802.11e, 802.11g, and/or 802.11n; in some embodiments, these communications can conform to Wi-Fi® certification standards established by the Wi-Fi Alliance. Other protocols and/or transports can also be supported. In some embodiments, different ones of transceiver modules 212, 214, and 216 can share some or all of their hardware elements (e.g., antennas, oscillators, amplifiers), and communications using different transceiver modules can be multiplexed to allow multiple transports to be in use concurrently.

RF communication interface 204 can also include a transport selection module 218, which can be implemented using fixed-function circuitry, programmable logic circuits executing firmware, or the like. Transport selection module 218 can determine which transport (and therefore which of transceiver modules 212, 214, 216) should be used in connection with particular data channels. For example, transport selection module 218 can implement dynamic transport selection using various logic processes described below. As described below, in a master device, transport selection module 218 can gather real-time data-exchange status information about transport performance and data requirements from other components of RF communication interface 204 and/or from a slave device. Based on the gathered information, transport selection module 218 can select a transport and initiate a switch to a different transport (also referred to as upgrading or downgrading the transport) if appropriate. In a slave device, transport selection module 218 can provide real-time data-exchange status information about transport performance and data requirements to the master device and can also receive and respond to instructions from a master device to upgrade or downgrade the transport. Examples are described below.

Operating system (OS) interface module 220 can facilitate communication between support layer 208 and other components of RF communication interface 204. For example, OS interface module 220 can convert data received from support layer 208 to a format for transmission based on a transport selected by selection module 218. OS interface module 220 can also convert data received at transmission modules 212, 214, 216 to a format expected by support layer 208.

In some embodiments, OS interface module 220 can help to render dynamic transport selection transparent to processes executing in central processor 202, such as support layer 208 and applications 206, so that applications 206 and support layer 208 need not be aware that dynamic transport switching is occurring at all or of which transport is currently in use.

It will be appreciated that computer system 200 is illustrative and that variations and modifications are possible. For example, computer system 200 can include any combination of any or all of the components described above, as well as other components not expressly described such as power supplies and/or power management components. In some embodiments, a user interface can include, e.g., a touchscreen, or a touchscreen and a speaker, a touchscreen and a haptic device, a touchscreen and a keyboard or keypad, and so on. Some devices can include wired data interfaces (e.g., USB port, Ethernet port) in addition to an RF communication interface. A wired power connection, e.g., for supplying operating power to the device and/or charging a battery of the device, can be provided separately from any data connection, or inductive (wireless) charging can be used.

Further, while computer system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software. It is also not required that every block shown in FIG. 2 be implemented in a given embodiment of the present invention.

A master device and a slave device can establish a connection that includes a control channel and one or more data channels, where each data channel can be associated with a specific "service" supported on both devices. As used herein, a "service" can refer to any application or system function that produces and/or consumes any type of data for and/or from another device. Examples of services include communication applications (e.g., email, telephony, social network applications), media applications (e.g., streaming audio and/or video), monitoring functions (e.g., providing sensor data from one device to another), and so on. Initially, when the master device and slave device connect, they can establish a control channel and use the control channel to define one or more data channels based on which services they have in common.

Figure 3:
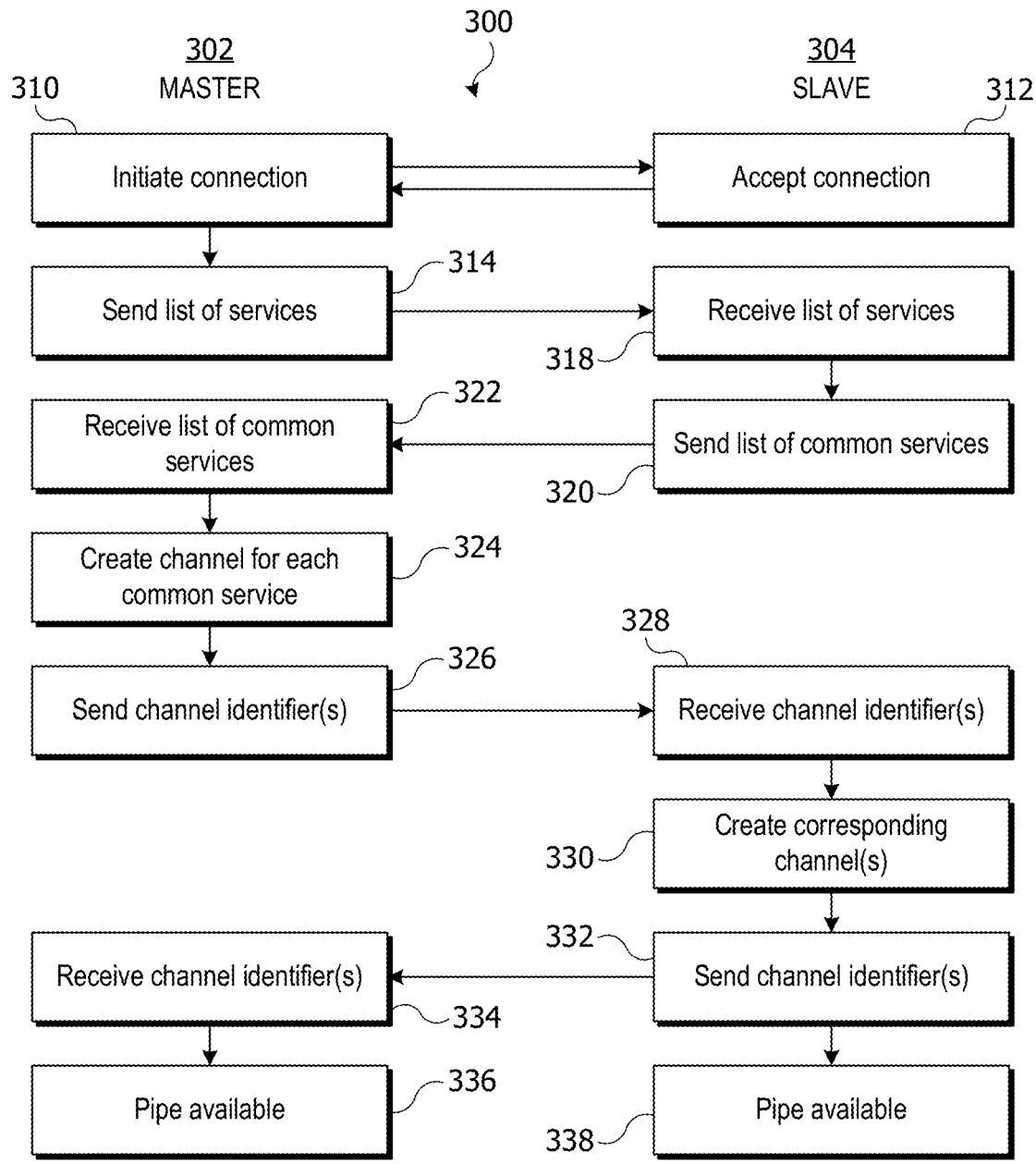
FIG. 3 is a flow diagram of a process for defining data channels according to an embodiment of the present invention.

FIG. 3 is a flow diagram of a process 300 for defining data channels according to an embodiment of the present invention. Process 300 can be performed using a master device 302 (which can be, e.g., mobile device 102 of FIG. 1) and a slave device 304 (which can be, e.g., companion device 100 of FIG. 1). At block 310, master device 302 can initiate a connection to slave device 304, and at block 312, slave device 304 can accept the connection, thereby establishing a control channel. Initiating and accepting a connection to establish a control channel can be performed in accordance with a standard protocol such as Bluetooth LE. In some embodiments, establishing the control channel can include establishing a shared secret such that communication on the control channel can be encrypted, e.g., by using the shared secret to generate an encryption key. In some embodiments, the same shared secret can be used for data channels as well, and this can speed up the creation of data channels.

At block 314, after the control channel connection is established, master device 302 can send a list of supported services. Supported services can be identified using a naming convention (e.g., a reverse domain name convention or any other convention such that a given service name is unambiguously mapped to the same service on both devices). The list can include all services supported by master device 302. Alternatively, master device 302 can select a subset of its supported services to expose to a particular slave device 304. Such selection can be based on information received from slave device 304 during establishment of the control channel connection at blocks 310 and 312.

At block 316, slave device 304 can receive the list of supported services. Based on the received list and its own supported services, slave device 304 can send a list of common services (i.e., services supported by both master device 302 and slave device 340) at block 318. This list can include all services supported by master device 302 that are also supported by slave device 304. Alternatively, slave device 304 can select a subset of common services to expose to a particular master device 302. Such selection can be based on information received from master device 302 during establishment of the control channel connection at blocks 310 and 312.

At block 322, master device 302 can receive the list of common services. This list can represent the full set of services that the devices might use during interoperation, and it is not required that all of the common services actually be used. At block 324, master device 302 can create a channel for each common service. Creating a channel for a service can include, e.g., assigning a channel identifier that distinguishes the channel from all other channels on master device 302, allocating various data buffers, setting up input stream 222 and output stream 224 for the corresponding application, selecting an initial transport, and so on. Channels established for specific services are referred to herein as "data channels" to distinguish them from the control channel established at blocks 310 and 312; however, it is to be understood that data channels can be used to exchange service-specific control messages as well as data. At block 326, master device 302 can send the channel identifier for each common service to slave device 304.

At block 328, slave device 304 can receive the channel identifier(s) from master device 302. At block 330, slave device 304 can create corresponding channels; this can be similar to block 324. At block 332, slave device 304 can send its channel identifiers to master device 302. (There is no requirement that master device 302 and slave device 304 use matching channel identifiers for a particular service.)

At block 334, master device 302 can receive the channel identifiers from slave device 304. Thereafter, at blocks 336 and 338, master device 302 and slave device 304 can enter a "pipe available" state, indicating to their common services that a data pipe is available, and data exchange can begin.

As described above with reference to FIG. 2, applications 206 (as well as other system processes) executing on central processor 202 of either a master device or a slave device can communicate with another device by writing data to an output stream 224 and reading data from an input stream 222. Data in the streams can be sent to and/or received from another device by operation of RF communication interface 204, transparently to applications 206.

Figure 4:
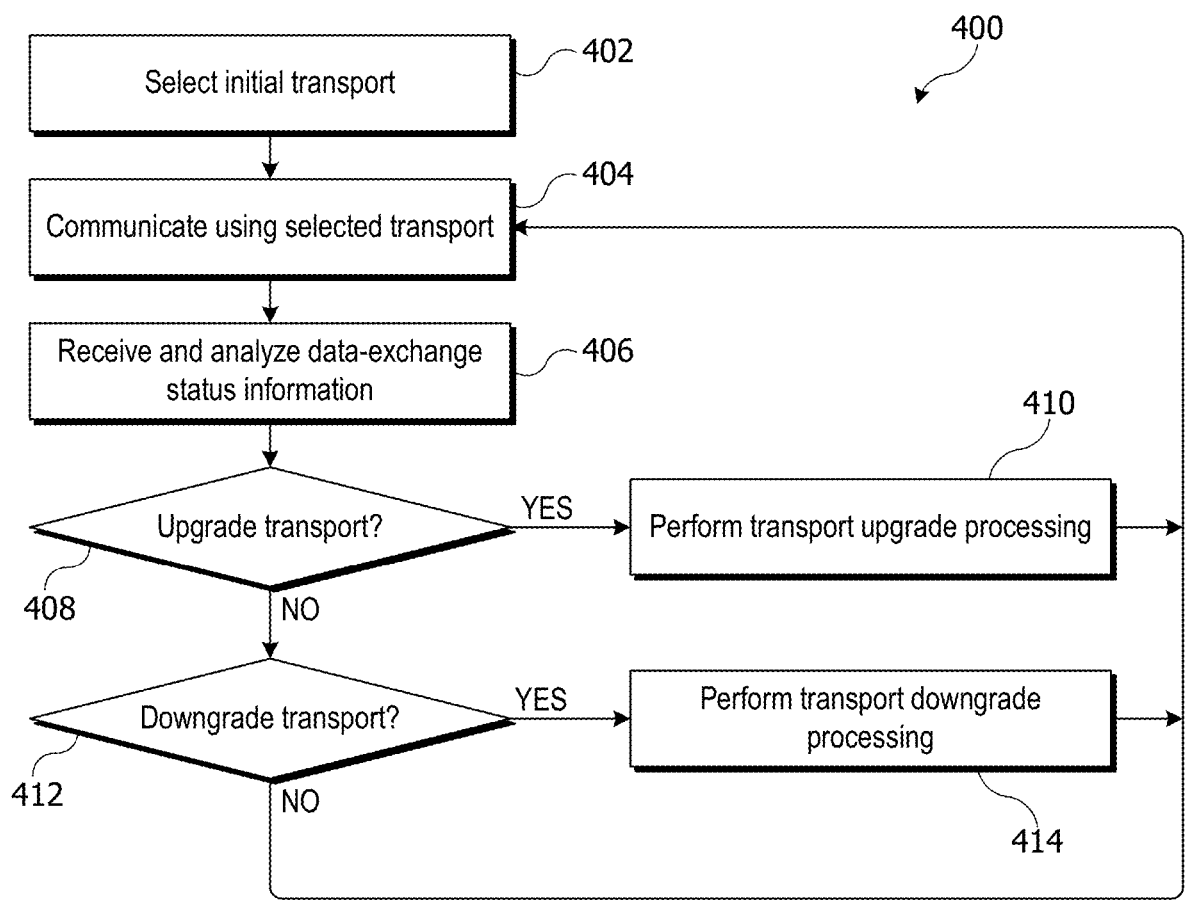
FIG. 4 is a flow diagram of a transport selection process according to an embodiment of the present invention.
Figure 5:
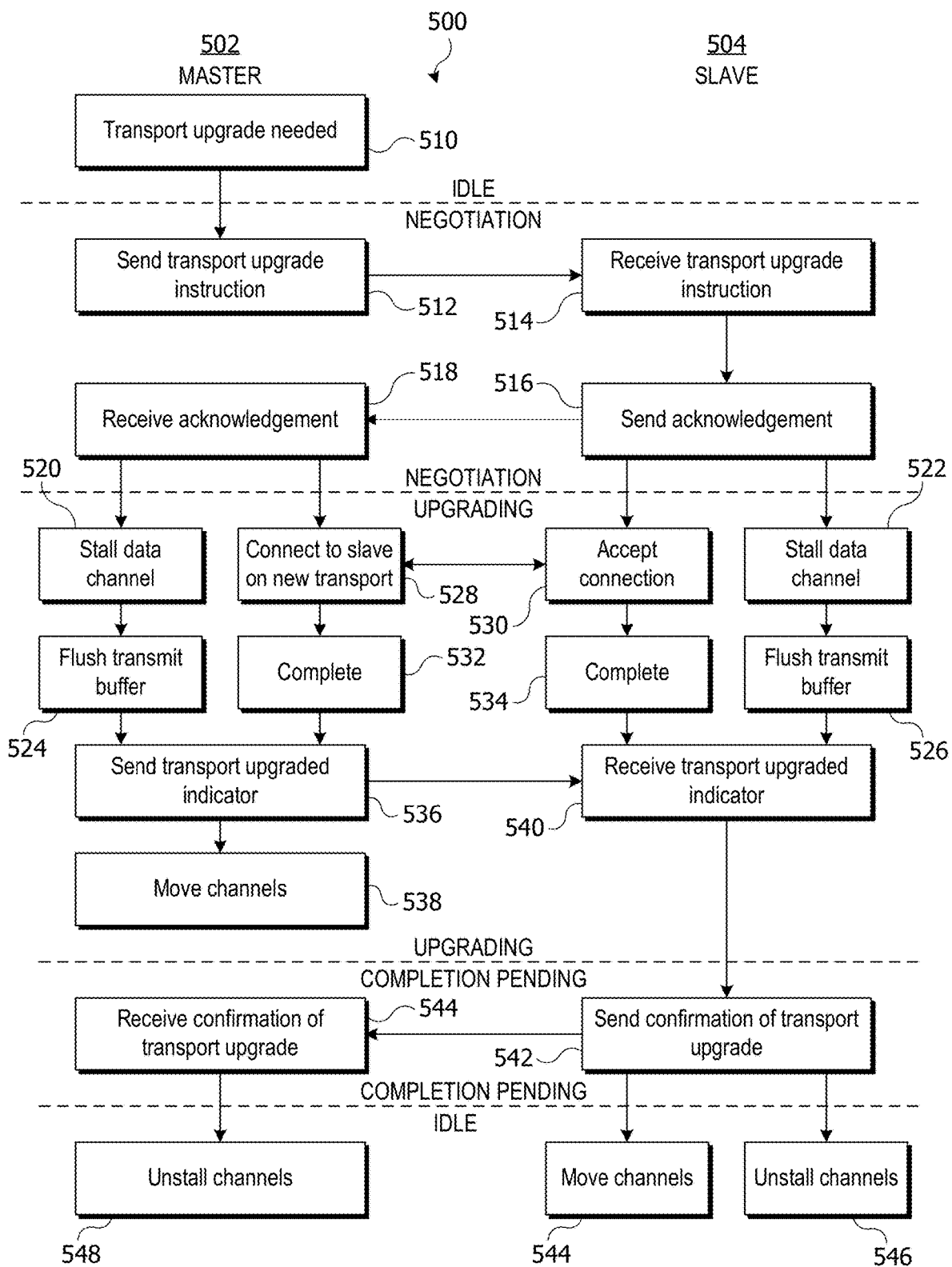
FIG. 5 is a flow diagram of a process for transport upgrade processing according to an embodiment of the present invention.
Figure 6:
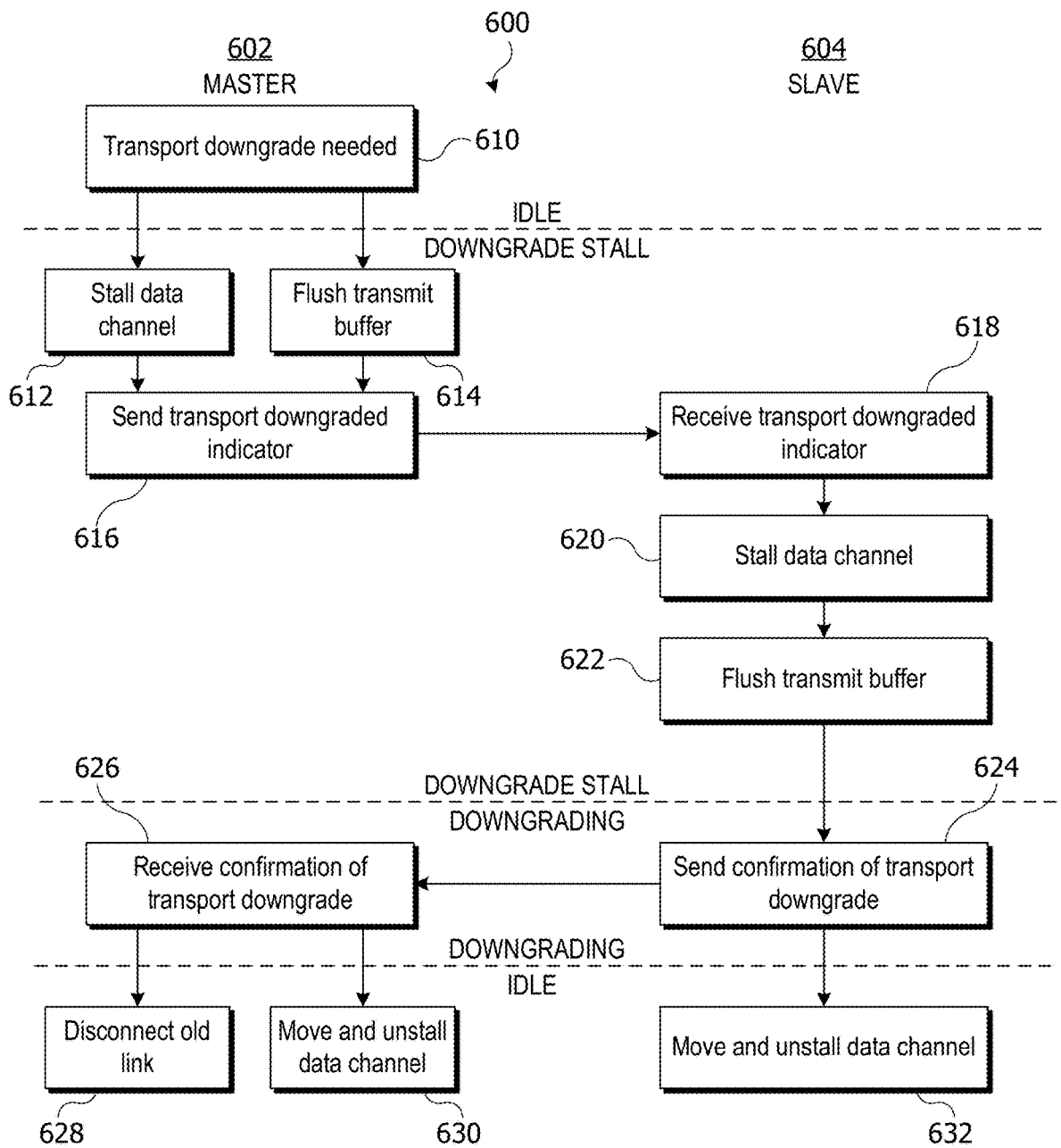
FIG. 6 is a flow diagram of a process for transport downgrade processing according to an embodiment of the present invention.

Among other features, this transparency allows RF communication interface 204 to provide dynamic transport switching, which can help to optimize device performance. FIGS. 4-6 are flow diagrams showing specific examples of logic that can be implemented in transport selection module 218 of FIG. 2 to dynamically select a transport for communicating with another device. The processes of FIGS. 4-6 can be executed by a master device (e.g., mobile device 102 of FIG. 1) communicating with a slave device (e.g., companion device 100).

Referring first to FIG. 4, there is shown a transport selection process 400 according to an embodiment of the present invention. Process 400 assumes that there are a finite number of transports available and that all of the available transports are ranked according to a power-consumption metric (e.g., power per byte). For example, if the transports are Bluetooth LE, Bluetooth BR/EDR, and 802.11, the ranking can be in that order, with Bluetooth LE having the lowest power consumption and 802.11 having the highest. In this context, "upgrading" a transport refers to moving to a transport with a higher power-consumption metric, and "downgrading" a transport refers to moving to a transport with a lower power-consumption metric. Using process 400, a master device can monitor real-time performance of the data channel(s) and move the data channel(s) to a different transport. The transport can be upgraded when performance is insufficient to meet the data transfer requirements of the devices (or particular applications that may be executing on the devices) and downgraded to conserve power when performance is high enough that a transport having lower performance would be expected to suffice.

At block 402, an initial transport can be selected for a data channel, and at block 404, the devices can begin communicating using the selected transport. For example, as described above, master device 302 and slave device 304 can initially connect a control channel using a lowest-power transport (e.g., Bluetooth LE). Additional data channels can be connected to support common services (e.g., as described above with reference to FIG. 3). In some embodiments, the control-channel transport can be the initial transport for data channels as well, as long as the data transfer requirements of the data channels do not exceed the capabilities of the control-channel transport. If the data transfer requirements exceed the capabilities of the control-channel transport, the data channels can be initially assigned to a different transport. The control channel can remain on the lowest-power transport at all times.

At block 406, transport selection logic 218 can receive and analyze data-exchange status information. As used herein, data-exchange status information can include several types of information, which can be categorized as "requirements" information, "performance" information, and/or other information related to the state of the transport. Requirements information can include information pertaining to the communication needs of particular applications (or system processes) that are communicating via a data channel. For instance, an application may specify a minimum acceptable throughput or a maximum acceptable latency. Requirements information can be received at transport selection logic 218 of the master device from applications (e.g., applications 206 of FIG. 2) executing on the master device. Additionally or instead, requirements information can be communicated over the control channel from the slave device to transport selection logic 218 of the master device. Data-exchange status information can also include real-time performance information such as the rate at which outbound data to the slave is being provided by central processor 202 (e.g., measured in bytes/second or packets/second), the error rate on a data channel, the rate at which inbound data from the slave is being received, buffer usage measurements, and the like. Other measurements of link quality, such as signal-to-noise ratio or link margin, can also be used as real-time performance information. Performance information can be measured at the master device, e.g., using transport selection logic 218 or other components of RF communication module 204 of FIG. 2. Additionally or instead, performance information can be communicated over the control channel from the slave device to transport selection logic 218 of the master device. Data-exchange status information can also include any other information available to the master device regarding the state of any of the available transports. For instance, in some embodiments, a master device may be able to determine whether devices other than the slave device are using a particular transport, which may reduce the maximum throughput of the transport. By way of illustration, a mobile phone can be a master device and can be concurrently paired via Bluetooth with two slave devices, such as a wrist-worn companion device and an audio headset. Standard Bluetooth protocols (e.g., Bluetooth BR/EDR) provide that the channel in such cases would be time-sliced between the two slave devices, reducing the throughput between the mobile phone and the companion device to approximately half the maximum throughput supported by the protocol.

At block 408, process 400 can determine whether the transport should be upgraded. The determination can be a multi-factor analysis taking into account any or all of the data-exchange status information items identified above, as well as whether an upgraded transport is available. In addition, the determination can take into account the overhead associated with upgrading the transport (e.g., the time required to upgrade, which can range from around 100-150 milliseconds up to 1-2 seconds, depending on the particular transports and other implementation details) and/or how long a time has elapsed since the last transport change (e.g., to prevent rapid ping-ponging between transports). Any type of decision algorithm can be implemented. In some embodiments, machine learning techniques can be used to train a decision algorithm (e.g., an artificial neural network or the like) using quality assurance data gathered during testing. For example, a testing team can measure device performance using different transports under different operating conditions and in different environments in a controlled manner. The data gathered can include any or all of the data-exchange status information items mentioned above. From this data, optimal transport selections for different operating conditions and environments can be determined (e.g., by identifying the lowest-power transport that provides adequate performance under given conditions), and this information can be used to train a decision algorithm to select an "optimal" transport in a wide variety of operating conditions and environments based on some or all of the data-exchange status information items mentioned above. The trained algorithm can be used at block 408. If it is determined that the transport should be upgraded, then at block 410, process 400 can perform transport upgrade processing.

Referring to FIG. 5, there is shown an example of a process 500 for transport upgrade processing that can be performed at block 410 of process 400 according to an embodiment of the present invention. As noted above, in some embodiments, the available transports can be ranked according to power consumption, and process 500 can be used to upgrade to the transport that is next in the ranked order, in the direction of increased power consumption. This stepwise progression to higher-power transports can prevent the transport from being upgraded to a higher-power transport than is actually required for a given circumstance.

Process 500 can begin at block 510 when master device 502 (which can be, e.g., mobile device 102 of FIG. 1) determines that a transport upgrade is needed, e.g., at block 408 of process 400. At block 512, process 500 can enter a "negotiation" state, and master device 502 can send a transport upgrade instruction to slave device 504 (which can be, e.g., companion device 100 of FIG. 1). In some embodiments, transport upgrades occur in a stepwise fashion based on a ranked order, and the upgrade instruction does not need to specify a transport; in other embodiments, master device 502 can select a new transport, and the upgrade instruction at block 512 can specify the new transport. At block 514, slave device 504 can receive the instruction and respond with an acknowledgement at block 516. Master device 502 can receive the acknowledgement at block 518. These instructions and acknowledgements can be sent using the control channel.

At this point, process 500 can enter an "upgrading" state. At blocks 520 and 522, master device 502 and slave device 504 can stall their respective outgoing data channels. Stalling an outgoing data channel can be performed by blocking further reads from a data buffer at some stage of the outgoing data path. For example, in some implementations using Bluetooth technology, there may be a data buffer at the L2CAP (Logical Link Control and Adaptation Protocol) layer, and the stall can be effected at this layer. In other implementations, the stall can occur in other buffers or layers. For instance, each transport may have an associated transport-specific transmit buffer, and the stall can occur in any buffer upstream of the transmit buffer. While a data channel is stalled, any output data produced by an application can continue to accumulate in buffers until all buffers (including output stream 224) are full, at which point the application can suspend further writing to output stream 224. While their respective data channels are stalled, master device 502 and slave device 504 can flush the transmit buffer (and any other buffers downstream of the stall) at blocks 524 and 526. Flushing the buffer can include sending all data from the buffer, and while the buffer is being flushed, the receiving device can continue to receive and process data using the old transport, to ensure that data is not lost in the transition.

In parallel with flushing data from the old transport path, at blocks 528 and 530, master device 502 and slave device 504 can establish a connection on the new transport. For example, if the transport is being upgraded from Bluetooth LE to Bluetooth BR/EDR, master device 502 can send a Bluetooth page to initiate a connection to slave device 504, and slave device 504 can perform a page scan to listen for the page. At blocks 532 and 534, master device 502 and slave device 504 can complete the new connection.

Operations at block 524 and 532 can complete in either order. At block 536, when the master device transmit buffer has been flushed and the new channel has been established, master device 502 can send a transport-upgraded indicator to slave device 504 (e.g., via the control channel) to indicate that master device 502 is ready to start using the new transport. Thereafter, at block 538, master device 502 can move the data channel(s) to the new transport, e.g., by redirecting the data path for these channels to the transmit buffer of the new transport. However, master device 502 can hold off sending data using the new transport until slave device 504 has confirmed that it is also ready.

At block 540, slave device 504 can receive the transport-upgraded indicator. Operations at block 526, 534, and 540 can complete in any order. After slave device 504 has flushed its transmit buffer (block 526), established a connection to master device 502 on the new transport (block 534), and received the transport-upgraded indicator (block 540), then at block 542, slave device 504 can send confirmation of transport upgrade to master device 504, and process 500 can enter a "completion pending" state. Thereafter, slave device can move the data channel(s) to the new transport at block 544 and unstall the data channels at block 546.

Master device 502 can receive the confirmation at block 544 and can unstall its data channels at block 548. At this point, process 500 can return to its "idle" state, as no transport upgrade is in progress, and both devices are now using the new (upgraded) transport. If the old transport is not is use, e.g., for the control channel, any circuitry associated with the old transport can be powered down.

Referring again to FIG. 4, if, at block 408, the transport should not be upgraded, then at block 412, process 400 can determine whether the transport should be downgraded. In some embodiments, downgrading can occur when analysis of the data exchange status information at block 406 indicates that power may be being wasted. For example, based on the data exchange status information, transport selection logic 218 can determine whether a lower-power transport should be able to meet the requirements of the master and slave with some headroom (e.g., 20%). The headroom requirement can reduce ping-ponging between transports in cases when the requirements are close to the limit of what the lower-power transport can provide. As with the upgrade determination at block 408, the downgrade determination at block 412 can be a multi-factor analysis that takes into account any or all of the data-exchange status information items identified above, as well as whether a downgraded transport is available. In addition, the determination can take into account the overhead associated with downgrading the transport (e.g., the time required to downgrade, which can range from around 100-150 milliseconds up to 1-2 seconds, depending on the transports and other implementation details) and/or how long a time has elapsed since the last transport change (e.g., to prevent rapid ping-ponging between transports). Any type of decision algorithm can be implemented, and machine learning techniques similar to those described above can be used to train a decision algorithm. If it is determined that the transport should be downgraded, then at block 414, process 400 can perform transport downgrade processing.

Referring to FIG. 6, there is shown an example of a process 600 for transport downgrade processing that can be performed at block 414 of process 400 according to an embodiment of the present invention. As noted above, in some embodiments, the available transports can be ranked according to power consumption, and process 600 can be used to change to the transport that is next down in the rankings. Alternatively, a more aggressive selection of the lowest-power transport capable of meeting the requirements (with some headroom) can be made. In this example, the data channel can be downgraded to use the same transport as the control channel; since a connection is already established for the control channel, the process can be streamlined relative to FIG. 5. If the data channel is being downgraded to a transport that does not have a current connection, a process similar to process 500 of FIG. 5 can be used.

Process 600 can begin at block 610 when master device 602 (which can be, e.g., mobile device 102 of FIG. 1) determines that a transport downgrade is needed, e.g., at block 412 of process 400. At this point, process 600 can enter a "downgrade stall" state. At block 612, master device 602 can stall its outgoing data channel, e.g., similarly to block 520 of process 500 described above, and at block 614, master device 602 can flush the transmit buffer (and any other buffers downstream of the stall), similarly to block 524 of process 500.

At block 616, master device 602 can send a transport-downgraded indicator to slave device 604, and slave device 604 can receive the indicator at block 618. In some embodiments, slave device 604 can infer the new transport from the indicator (e.g., that the new transport is the same as the control-channel transport); in other embodiments, the indicator can specify the new transport.

At block 620, slave device 604 can stall its outgoing data channel, e.g., similarly to block 522 of process 500 described above, and at block 622, slave device 604 can flush its transmit buffer (and any other buffers downstream of the stall), similarly to block 526 of process 500.

Once the slave's transmit buffer is empty, process 600 can enter a "downgrading" state, and at block 624, slave device 604 can send confirmation of the transport downgrade to master device 602. Master device 602 can receive the confirmation at block 626. Master device 602 can disconnect the old link at block 628 and move the data channel to the new transport at block 630; at this point, the data channel can be unstalled, allowing data to flow on the new transport. At block 632, slave device 604 can move and unstall its data channel. At this point, process 600 can be in an "idle" state, as no transport downgrade is in progress, and both devices are now using the new (downgraded) transport. If the old transport is not in use, any circuitry associated with the old transport can be powered down.

Referring again to FIG. 4, transport upgrade processing at block 410 or transport downgrade processing at block 414 can result in a change in the selected transport. In any case, process 400 can return to block 404 to continue data communication using the selected transport. Process 400 can continue as long as the link between master and slave persists, which can be for as long as the devices continue to maintain at least a control channel between them. Process 400 can start over at block 402 if communication is interrupted (e.g., if a connection is lost).

Using processes 400, 500 and 600 (or similar processes), it is possible to monitor the data channel performance and dynamically select a transport in real time based on the performance of the data channel and the requirements of the applications or other processes that produce and/or consume the data, either or both of which can change as a function of time. Dynamic transport selection can help to maintain latency and throughput at levels that provide a satisfactory user experience in the face of changing requirements and/or performance. At the same time, the ability to downgrade the transport in the event that a lower-power transport is sufficient can allow for conservation of device power. The combination of a conservative transport-upgrade policy and an aggressive transport-downgrade policy can result in selecting the most energy-efficient transport that is capable of meeting the data-transfer requirements at a given time. This can allow energy consumption to be reduced without adversely affecting the user experience.

It will be appreciated that the process described above are illustrative and that variations and modifications are possible. Steps described as sequential may be executed in parallel, order of steps may be varied, and steps may be modified, combined, added or omitted. In some embodiments, a process similar to process 500 can be used for transport downgrade in cases where a connection on the downgraded transport needs to be established, and a process similar to process 600 can be used for transport upgrade in cases where a connection on the upgraded transport is already established. In some embodiments, a slave device can expressly request a transport upgrade or downgrade, e.g., by sending a request to the master device via the control channel, and the master device can respond to the request by initiating upgrade or downgrade processing. Depending on implementation, the request might or might not specify the new transport to be used.

Some implementations can provide multiple data channels defined between a master and slave device. In some embodiments, all data channels can use the same transport, and processes 400, 500 and 600 (or similar processes) can be used to move all data channels to a new transport in a single operation. In other embodiments, the decision to switch transports can be made on a per-channel basis, and different data channels can be on different transports at any given time.

In examples described above, transport upgrade and downgrade can be performed for data channels while maintaining a control channel on a static transport, which can be the lowest-power transport. All instructions, indicators, acknowledgements, and error messages related to dynamic transport switching can be sent using the control channel so that the devices can continue to communicate even while the data channel is stalled on one or both devices. In the event of an error during transport switching (e.g., during execution of process 500 or process 600), or if the transport switch cannot be completed within a timeout period, the devices can revert to the transport that was in use prior to the attempted switch. The switch can be retried at a later time.

Figure 7:
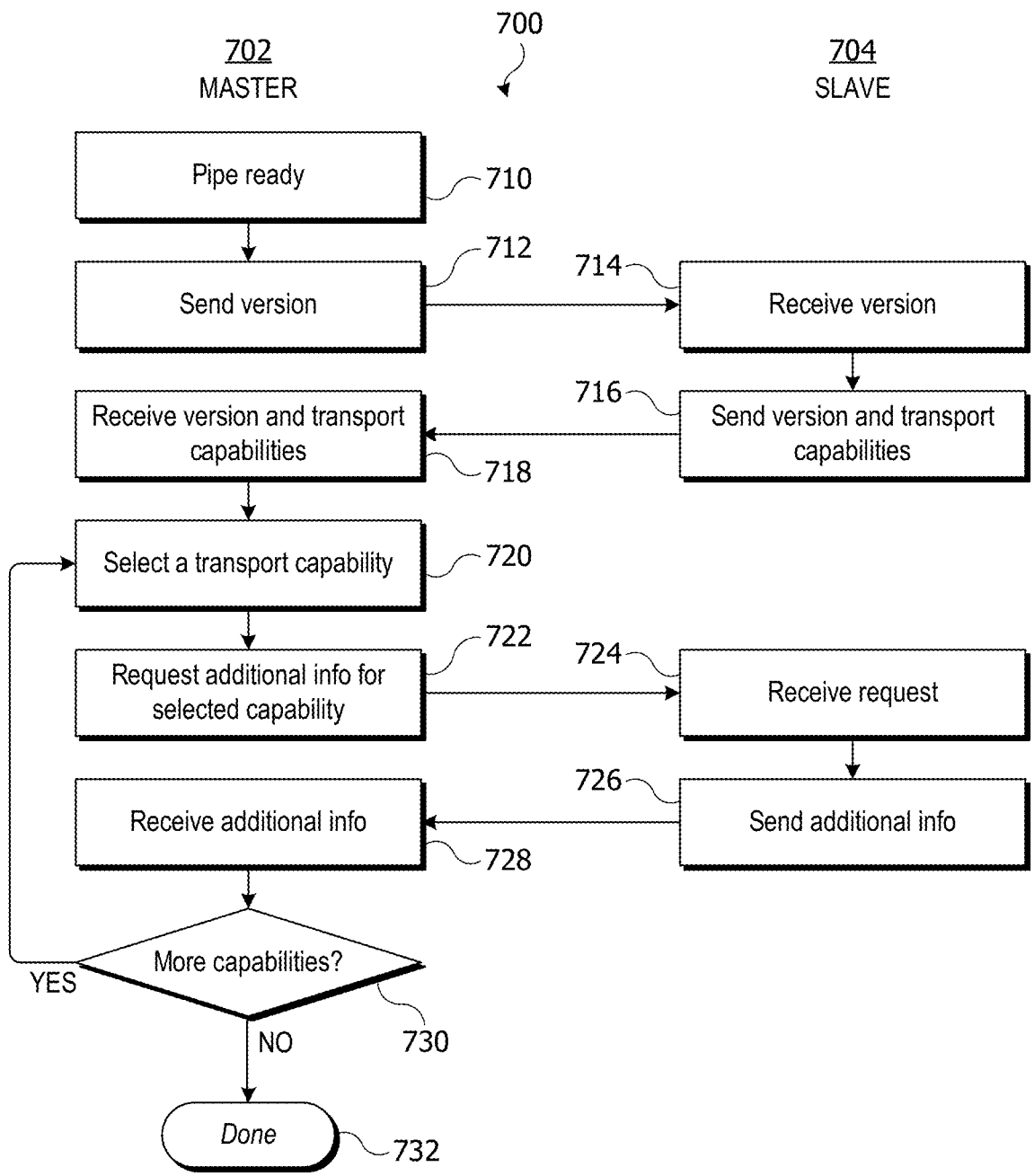
FIG. 7 is a flow diagram of a process for exchanging transport capability information according to an embodiment of the present invention.

In some embodiments, the master device can select a transport based in part on transport capability information provided by the slave device. FIG. 7 is a flow diagram of a process 700 for exchanging transport capability information according to an embodiment of the present invention. Process 700 can be performed after a connection is established between a master device 702 (which can be, e.g., mobile device 102 of FIG. 1) and a slave device 704 (which can be, e.g., companion device 100 of FIG. 1).

Process 700 can begin when a pipe for exchanging messages is available, e.g., after process 300 of FIG. 3 has established at least a control channel. At block 712, master device 702 can send its version information (e.g., which version of dynamic transport selection is in use) to slave device 704 via the control channel.

At block 714, slave device 704 can receive the version information and respond by sending its version information and transport capabilities at block 716. The transport capabilities can include various attributes descriptive of each transport supported by slave device 704. For example, the transport capabilities can include any or all of: a transport identifier assigned by master device 702; an indicator of the transport technology (e.g., Bluetooth LE, Bluetooth BR/EDR, specific 802.11 implementations, proprietary technologies, etc.); a maximum throughput for the transport; a latency for the transport; power consumption at maximum throughput for the transport; what fraction of the maximum throughput is actually usable (e.g., depending on whether other devices are sharing the transport); and/or an indicator that additional information is available. More, fewer, or different information items can be included. At block 718, master device 718 can receive the information.

If the transport capabilities received at block 718 indicate that additional information is available, then at block 720, master device 702 can select a transport capability for which additional information should be retrieved. At block 722, master device 702 can send a request for the additional information for the selected transport capability. Slave device 704 can receive the request at block 724 and send the requested additional information at block 726. Master device 702 can receive the additional information at block 728. At block 730, master device 702 can determine whether there are more transport capabilities for which additional information is available, and process 700 can return to block 720 to allow master device 702 to obtain the additional information for another transport capability. Once all information has been obtained, process 700 can end at block 732.

Transport capabilities of the slave device can change over time. For instance, maximum throughput or usable throughput may increase or decrease depending on factors such as how busy a transport is and/or the slave device's power reserves. Accordingly, some embodiments provide a message that the slave device can send on the control channel at any time to notify the master device of a capabilities change. The message can include the transport identifier to which the changes pertain and the particular attributes that have changed.

In some embodiments, dynamic transport selection is employed only in instances where both devices support the behavior. A device that supports dynamic transport selection can be interoperable with a device that does not. For example, a device can indicate its ability to support dynamic transport selection when the devices initially connect, e.g., during an initial pairing process or other process in which the devices exchange information about their identity and capabilities. If a master device (e.g., a mobile device) that supports dynamic transport selection determines that it is paired with a slave device (e.g., a companion device) that does not support dynamic transport selection, the master device can simply disable dynamic transport selection and use a static transport while communicating with that slave. If a slave device that supports dynamic transport selection determines that it is paired with a master device that does not support dynamic transport selection, the slave device can disable sending of data exchange status information, transport upgrade or downgrade requests, and any other activity associated with dynamic transport selection.

Embodiments of the present invention, e.g., in methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

While the invention has been described with respect to specific embodiments, one skilled in the art will recognize that numerous modifications are possible. Thus, although the invention has been described with respect to specific embodiments, it will be appreciated that the invention is intended to cover all modifications and equivalents within the scope of the following claims.

What is claimed is:

1. A method implemented in a wireless communication interface processor of a master device, the method comprising:
    establishing, by the master device, a control channel and a data channel to communicate with a slave device, the data channel using a first transport selected from a plurality of available transports, wherein the control channel is different than the data channel;
    determining, by the master device based on data exchange status information, that the data channel should be switched to a second transport selected from the plurality of available transports, wherein the second transport is different than the first transport, and wherein the data exchange status information comprises two or more selected from:
        a slave requirement for data transfer, the slave requirement being received via the control channel from the slave device;
        a master requirement for data transfer specified by a process executing on the master device;
        a throughput measurement of the data channel;
        a buffer usage measurement;
        a transition time for moving the data channel from the first transport to the second transport; and
        information as to whether any device other than the slave device is using the first or the second transport;
    communicating, by the master device to the slave device via the control channel, an instruction to switch the data channel to the second transport; and
    switching, by the master device, the data channel to the second transport, wherein switching the data channel includes:
        stalling the data channel by the master device, wherein stalling the data channel includes blocking reads from a data buffer in an outgoing data path of the data channel;
        flushing, by the master device, a transmit buffer downstream of the data buffer in the outgoing data path of the data channel while the data channel is stalled;
        in conjunction with the transmit buffer being flushed, processing, by the master device, data received via the first transport;
        establishing, by the master device, a connection with the slave device on the second transport;
        sending, by the master device, a transport change confirmation to the slave device after the transmit buffer is flushed and the connection is established; and
        after sending the transport change confirmation, unstalling the data channel by the master device.

2. The method of claim 1 wherein the control channel uses the first transport and does not switch to the second transport.

3. The method of claim 2 wherein the plurality of available transports is ranked according to a power consumption metric and wherein the first transport has a lowest power consumption metric among the plurality of available transports.

4. The method of claim 1 wherein the second transport has a higher power consumption per byte than the first transport.

5. The method of claim 1 wherein the second transport has a lower power consumption per byte than the first transport.

6. The method of claim 1 wherein the control channel uses a third transport of the plurality of available transports.

7. The method of claim 1 wherein switching the data channel occurs while a data transfer is in progress.

8. The method of claim 1 wherein the data exchange status information comprises the slave requirement for data transfer, the slave requirement being received via the control channel from the slave device.

9. An electronic device comprising:
    a central processor to execute one or more applications that exchange data with a slave device; and
    a wireless communication interface processor coupled to the central processor, the wireless communication interface processor supporting a plurality of available transports for data communication with other devices, the wireless communication interface processor being configured to:
establish, by the electronic device, a control channel and a data channel to communicate with a slave device, the data channel using a first transport selected from the plurality of available transports;
determine, based on data exchange status information by the electronic device, that the data channel should be switched to a second transport selected from the plurality of available transports, wherein the second transport is different than the first transport, and wherein the data exchange status information comprises two or more selected from:
a slave requirement for data transfer, the slave requirement being received via the control channel from the slave device;
a master requirement for data transfer specified by a process executing on the central processor;
a throughput measurement of the data channel;
a buffer usage measurement;
a transition time for moving the data channel from the first transport to the second transport; and
information as to whether any device other than the slave device is using the first or second transport;
communicate, by the electronic device, with the slave device via the control channel to switch the data channel to the second transport, wherein communicating with the slave device to switch the data channel to the second transport includes:
stall the data channel by the electronic device, wherein stalling the data channel includes blocking reads from a data buffer in an outgoing data path of the data channel;
flush, by the electronic device, a transmit buffer downstream of the data buffer in the outgoing data path of the data channel while the data channel is stalled;
in conjunction with the transmit buffer being flushed, process, by the electronic device, data received via the first transport;
establish, by the electronic device, a connection with the slave device on the second transport;
send, by the electronic device, a transport change confirmation to the slave device after the transmit buffer is flushed and the connection is established; and
after sending the transport change confirmation, unstall the data channel by the electronic device.

10. The electronic device of claim 9 wherein the plurality of available transports includes at least a Bluetooth LE transport, a Bluetooth BR/EDR transport, and an IEEE 802.11 transport.

11. The electronic device of claim 9 wherein the data exchange status information includes the master requirement for data transfer specified by a process executing on the central processor.

12. The electronic device of claim 9 wherein the data exchange status information includes slave status information received from the slave device via the control channel.

13. The electronic device of claim 9 wherein the data exchange status information includes information as to whether any device other than the slave device is using the first or second transport.

14. The electronic device of claim 9 wherein the second transport has a higher performance and a higher power consumption than the first transport and wherein the wireless communication interface processor is further configured to switch the data channel to the second transport in case that a performance of the first transport is insufficient to meet a data transfer requirement determined from the data exchange status information.

15. A method implemented in a wireless communication interface processor of a slave device, the method comprising:
establishing, by the slave device, a control channel and a data channel with a master device, the control channel and data channel using a first transport selected from a plurality of available transports;
receiving, via the control channel of the slave device, an instruction from the master device to switch the data channel to a second transport selected from the plurality of available transports, wherein the second transport is different than the first transport;
switching, by the slave device, the data channel to the second transport in response to the instruction from the master device, wherein the instruction is based at least in part on data exchange information from the master device comprises two or more selected from:
a slave requirement for data transfer, the slave requirement being received via the control channel from the slave device;
a master requirement for data transfer specified by a process executing on the master device;
a throughput measurement of the data channel;
a buffer usage measurement;
a transition time for moving the data channel from the first transport to the second transport; and
information as to whether any device other than the slave device is using the first or second transport, wherein switching the data channel includes:
communicating with the master device via the control channel using the first transport to coordinate the switching;
stalling the data channel by the slave device, wherein stalling the data channel includes blocking reads from a data buffer in an outgoing data path of the data channel;
flushing, by the slave device, a transmit buffer downstream of the data buffer in the outgoing data path of the data channel while the data channel is stalled;
in conjunction with the transmit buffer being flushed, processing, by the slave device, data received via the first transport;
establishing, by the slave device, a connection with the master device on the second transport;
sending, by the slave device, a transport change confirmation to the master device after the transmit buffer is flushed and the connection is established; and
after sending the transport change confirmation, unstalling the data channel by the slave device.

16. The method of claim 15 further comprising:
transmitting, via the control channel, slave status information to the master device, the slave status information being usable by the master device to determine whether to switch the data channel to a different transport.

17. The method of claim 16 wherein the slave status information includes a slave requirement for data transfer.

18. The method of claim 15 wherein the control channel uses the first transport and does not switch to the second transport.

19. The method of claim 15 wherein the plurality of available transports includes at least a Bluetooth LE transport, a Bluetooth BR/EDR transport, and an IEEE 802.11 transport.

20. The method of claim 1, wherein determining that the data channel should be switched to the second transport is further based on power consumption of the second transport.

21. The method of claim 1, further comprising:
determining a subset of the plurality of available transports that meet requirements defined by the data exchange status information, wherein the second transport is selected from the subset of the available transports based at least in part on a power consumption of the second transport with respect to the subset of the available transports.

22. The method of claim 1, wherein establishing the data channel to communicate with the slave device includes:
receiving, from the slave device, a list of one or more services supported by the slave device;
identifying one or more common services supported by the master device and the slave device; and
creating the data channel for a first common service of the one or more common services, wherein a first channel identifier is assigned to the data channel.

23. The method of claim 22, wherein the data channel comprises a first data channel, and wherein the method further comprises:
creating a second data channel for a second common service of the one or more common services, wherein the second data channel has a second channel identifier that is different than the first channel identifier, the second data channel using a different transport than the first data channel.

24. The method of claim 1 wherein the control channel and the data channel each comprise a direct connection between the master device and the slave device without use of an intermediate network device.

25. The method of claim 1 wherein the data exchange status information comprises the information as to whether any device other than the slave device is using the first or the second transport.

26. The method of claim 1 wherein the data exchange status information comprises the master requirement for data transfer specified by the process executing on the master device.

27. The method of claim 1 wherein the data exchange status information comprises the throughput measurement of the data channel.

28. The method of claim 1 wherein the data exchange status information comprises the buffer usage measurement.

29. The method of claim 1 wherein the data exchange status information comprises the transition time for moving the data channel from the first transport to the second transport.

* * * * *